United States Patent [19]
Hatano et al.

[11] Patent Number: 5,301,025
[45] Date of Patent: Apr. 5, 1994

[54] PARABOLIC WAVEFORM GENERATING APPARATUS

[75] Inventors: Takahisa Hatano, Settsu; Yosuke Izawa, Ibaraki, both of Japan

[73] Assignee: Matsushita Electric Industrial Co. Ltd., Kadoma, Japan

[21] Appl. No.: 9,894

[22] Filed: Jan. 27, 1993

[30] Foreign Application Priority Data

Feb. 3, 1992 [JP] Japan .................. 4-047823

[51] Int. Cl.⁵ .............. H04N 3/23; H04N 3/22; H04N 3/223; H04N 3/27
[52] U.S. Cl. .............. 348/704; 315/368.12; 315/368.21; 315/392; 348/806
[58] Field of Search .............. 358/167, 242, 160, 60, 358/180, 188; 315/368.12, 368.18, 368.21, 370, 371, 391, 392, 394; H04N 3/23, 5/44, 5/46, 3/22, 3/223, 3/233, 3/237, 3/27, 3/28

[56] References Cited

U.S. PATENT DOCUMENTS

| | | | |
|---|---|---|---|
| 3,757,161 | 9/1973 | Kline | 315/370 |
| 4,551,754 | 11/1985 | Meise | 358/180 |
| 5,070,281 | 12/1991 | Ogino et al. | 315/370 |

FOREIGN PATENT DOCUMENTS

| | | | |
|---|---|---|---|
| 0298362 | 1/1989 | European Pat. Off. | H04N 5/44 |
| 0431902A3 | 6/1991 | European Pat. Off. | H04N 9/28 |
| 58-204675 | 11/1983 | Japan | H04N 3/16 |
| 63-284976 | 11/1988 | Japan | H04N 3/23 |
| 323677 | 7/1989 | Japan | H04N 3/233 |
| 282974 | 11/1989 | Japan | H04N 3/23 |
| 2-82884 | 3/1990 | Japan | 358/180 |
| 198584 | 8/1991 | Japan | H04N 3/27 |
| 4-3663 | 1/1992 | Japan | H04N 3/23 |
| 4-100486 | 4/1992 | Japan | H04N 3/23 |
| 4-216274 | 8/1992 | Japan | H04N 3/23 |
| 4-282970 | 10/1992 | Japan | H04N 3/27 |
| WO91/03129 | 8/1989 | PCT Int'l Appl. | H04N 9/28 |
| WO91/06176 | 10/1989 | PCT Int'l Appl. | H04N 3/22 |

*Primary Examiner*—James J. Groody
*Assistant Examiner*—Chris Grant
*Attorney, Agent, or Firm*—Ratner & Prestia

[57] ABSTRACT

Horizontal or vertical parabolic waveforms corresponding to arbitrary aspect ratios are generated with a relatively small number of memory devices for storing data values which are used for generating parabolic waveforms to compensate horizontal or vertical deflection distortion in television receivers. A first and second memory device which each store data values for generating parabolic waveforms necessary for the images of a specific aspect ratio (for example (4:3) and (16:9)) are provided. When a desired aspect ratio is given to a logic circuit, two coefficients are calculated in a coefficient arithmetic logic unit and the outputs of the first and the second memory devices are allocated proportionally in a logic circuit. The output data values of the logic circuit are then converted to a desired parabolic waveform.

1 Claim, 4 Drawing Sheets

PARABOLIC WAVEFORM GENERATING APPARATUS

BACKGROUND OF THE INVENTION (1) Field of the Invention

This invention relates to a parabolic waveform generating apparatus used for compensating horizontal or vertical deflection distortion in television receivers.

(2) Description of the Prior Art

In the field of television receivers, Cathode Ray Tubes (CRT's) with an aspect ratio (horizontal to vertical size of the image) of (4:3) have typically been used. But recently, television receivers employing CRT's with a different aspect ratio have been developed. In a High Definition Television (HDTV) System for instance, the CRT has an aspect ratio of (16:9). In order to display an image of aspect ratio (16:9) on an ordinary CRT with an aspect ratio (4:3), several methods have been considered. One method includes a change in the vertical or horizontal deflection size.

In the parabolic waveform generating apparatus employed for compensating the horizontal or vertical deflection current in the television receivers, as well as in the other kinds of devices, digital techniques have been adopted in order to reduce the influence of change by year, in order to be able to adjust the circuits easily during production, and so on.

FIG. 1 is a block diagram of an exemplary parabolic waveform generating apparatus employing digital technique and FIG. 2 illustrates parabolic waveforms generated by the apparatus shown in FIG. 1. In FIG. 1, ROM 1, ROM 2, ROM 3, and ROM 4 are Read-Only-Memories storing the data for generating the first, second, third, and fourth parabolic waveforms respectively. And the first, second, third, and fourth parabolic waveforms are those for compensating the deflection distortion of the images with aspect ratios of (4:3), (16:9), (5:3), and (4.5:3) respectively. The selector 5 is an electronic switch which selects data for generating a parabolic waveform for the specified aspect ratio by means of a control signal.

In FIG. 2, the waveform (1) is a parabolic waveform converted in the parabolic waveform generating circuit 6 from the data signal which is read out from ROM 1 and selected by the selector 5. Therefore, the waveform (1) is a compensating current waveform for the image with an aspect ratio (16:9). Likewise the waveforms (2), (3), and (4) are parabolic waveforms converted in the parabolic waveform generating circuit 6 from the data signals which are read out from ROM 2, ROM 3, and ROM 4 respectively and selected by the selector 5. Therefore, the waveforms (2), (3), and (4) are compensating current waveforms for the images with aspect ratios of (4:3), (4.5:3), and (5:3) respectively. The same consideration can be adopted in a parabolic waveform generating apparatus for compensating horizontal deflection distortion as the above-mentioned vertical one.

However, parabolic waveform generating devices have typically had several problems. That is, multiple ROMs are typically required to store the data for generating the respective parabolic waveforms for each different aspect ratio. As more kinds of aspect ratios are requested, more ROM's are typically required.

SUMMARY OF THE INVENTION

The present invention relates to a parabolic waveform generating apparatus which includes (1) no more than two groups of data values which are included, for example, in two ROM's or a ROM with no more than two address ports, each of said groups including data necessary for generating parabolic waveforms for compensating the horizontal or vertical deflection distortions of the images of two basic aspect ratios, (2) a logic circuit to calculate data for generating parabolic waveforms corresponding to an arbitrary aspect ratio from the data for generating parabolic waveforms corresponding to the basic aspect ratio which are read out from said each ROM, and (3) a parabolic waveform generating circuit to generate a parabolic waveform from the data corresponding to the arbitrary aspect ratio.

According to the present invention, when the data for generating parabolic waveforms corresponding to the two basic aspect ratios are stored in each ROM and an arbitrary aspect ratio is given to the logic circuit, the data for generating the desired parabolic waveform is obtained from the data for generating parabolic waveforms corresponding to the two basic aspect ratios stored in the two ROM's.

DETAILED DESCRIPTION OF THE INVENTION

Figure 1:
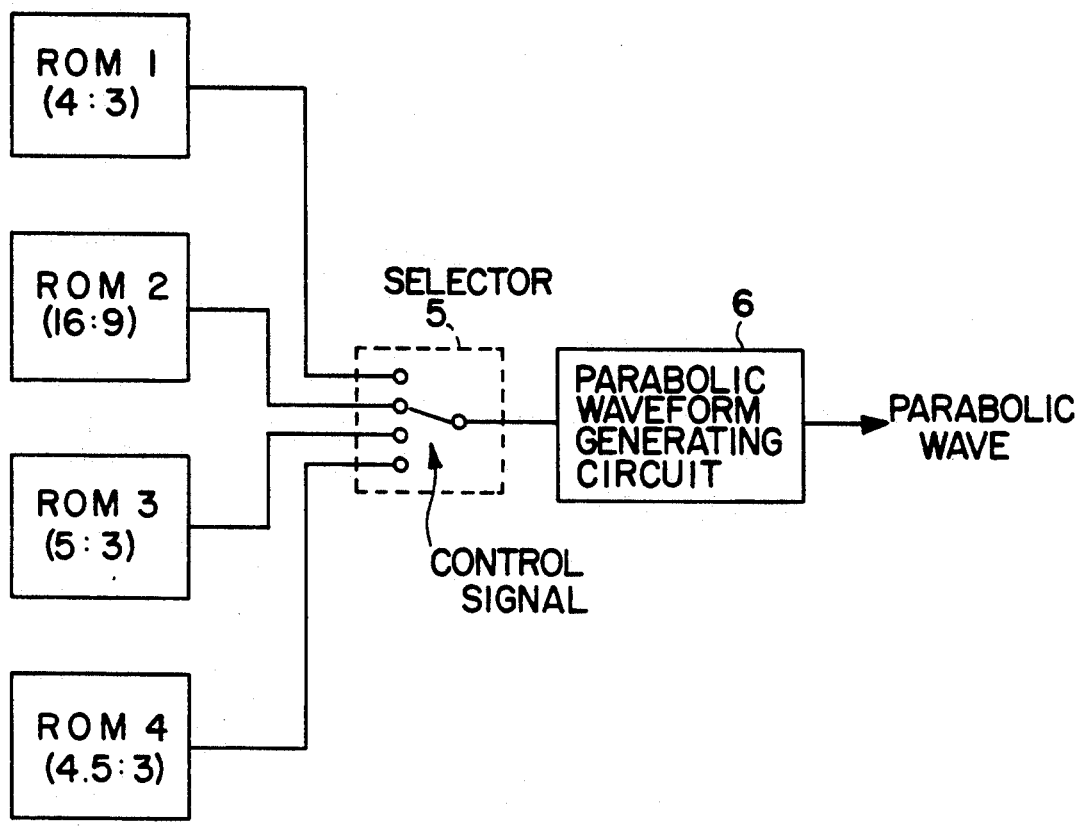
FIG. 1 is a block diagram of a prior art parabolic waveform generating apparatus.
Figure 2:
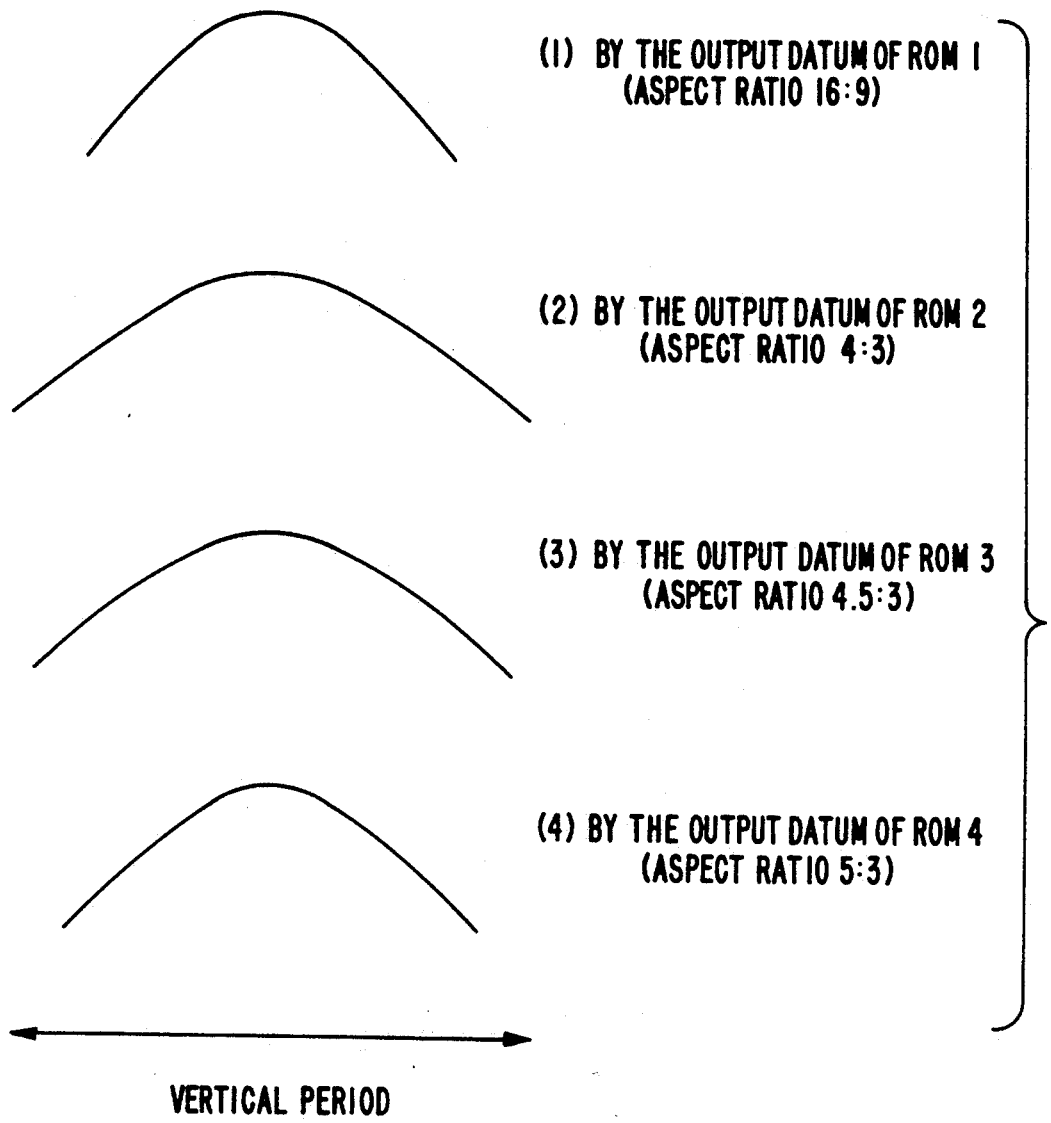
FIG. 2 illustrates waveforms of the output of the parabolic waveform generating apparatus shown in FIG. 1. Waveform (1) is the output derived by the output data of ROM 1. Waveform (2) is the output derived by the output data of ROM 2. Waveform (3) is the output derived by the output data of ROM 3. Waveform (4) is the output derived by the output data of ROM 4.
Figure 3:
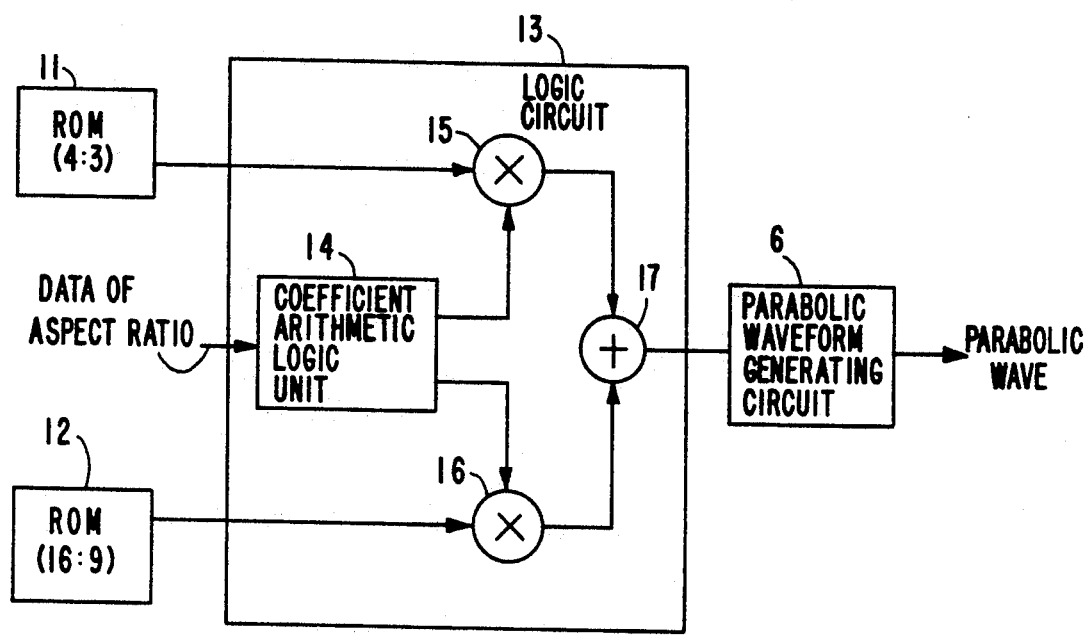
FIG. 3 is a block diagram of the parabolic waveform generating apparatus according to an exemplary embodiment of the present invention.

An exemplary embodiment of the present invention is illustrated by FIG. 3 and FIG. 4(a)–(c). FIG. 3 shows a block diagram of the parabolic waveform generating apparatus. In FIG. 3, ROM 11 is a Read-Only-Memory in which is stored data values for generating the first parabolic waveform and ROM 12 is a Read-Only-Memory in which is stored data values for generating the second parabolic waveform. Taking one numerical example, the data values for generating parabolic waveforms corresponding to the aspect ratios (4:3) and (16:9) are stored in ROM 11 and ROM 12 respectively. The outputs of ROM 11 and ROM 12 are applied to the logic circuit 13. The logic circuit 13 is a signal processor which calculates data for generating parabolic waveforms corresponding to arbitrary aspect ratios between the above-mentioned two basic aspect ratios, based on the data of ROM 11 and ROM 12.

The logic circuit 13 is comprised of a coefficient arithmetic logic unit 14, multipliers 15 and 16, and an adder 17. The coefficient arithmetic logic unit 14 is an arithmetic logic unit which calculates arithmetic coefficients a and (1-a) according to equation (1) shown below when a reciprocal of the aspect ratio H/V is given.

$$a = (1 - V/H \times 16/3) \quad (1)$$

These arithmetic coefficients a and (1-a) are applied to the multipliers 16 and 15 respectively. In the multiplier 15, multiplication of the output signal from ROM 11 and the coefficient (1-a) is done and in the multiplier 16, multiplication of the output signal from ROM 12 and the coefficient a is done.

The adder 17 is a circuit which adds the products from the multipliers 15 and 16. The output of the adder 17 is expressed by the following equation (2).

$$\text{(output of adder 17)} = \text{(output of ROM 11)} \times (1-a) + \text{(output of ROM 12)} \times a \quad (2)$$

Thus, when a specified aspect ratio is given to the coefficient arithmetic logic unit 14, the outputs of ROM 11 and ROM 12 are allocated proportionally and a data value corresponding to the specified aspect ratio is obtained at the output of the adder 17. This data value is converted to a corresponding parabolic waveform at the parabolic waveform generating circuit 6.

Figure 4:
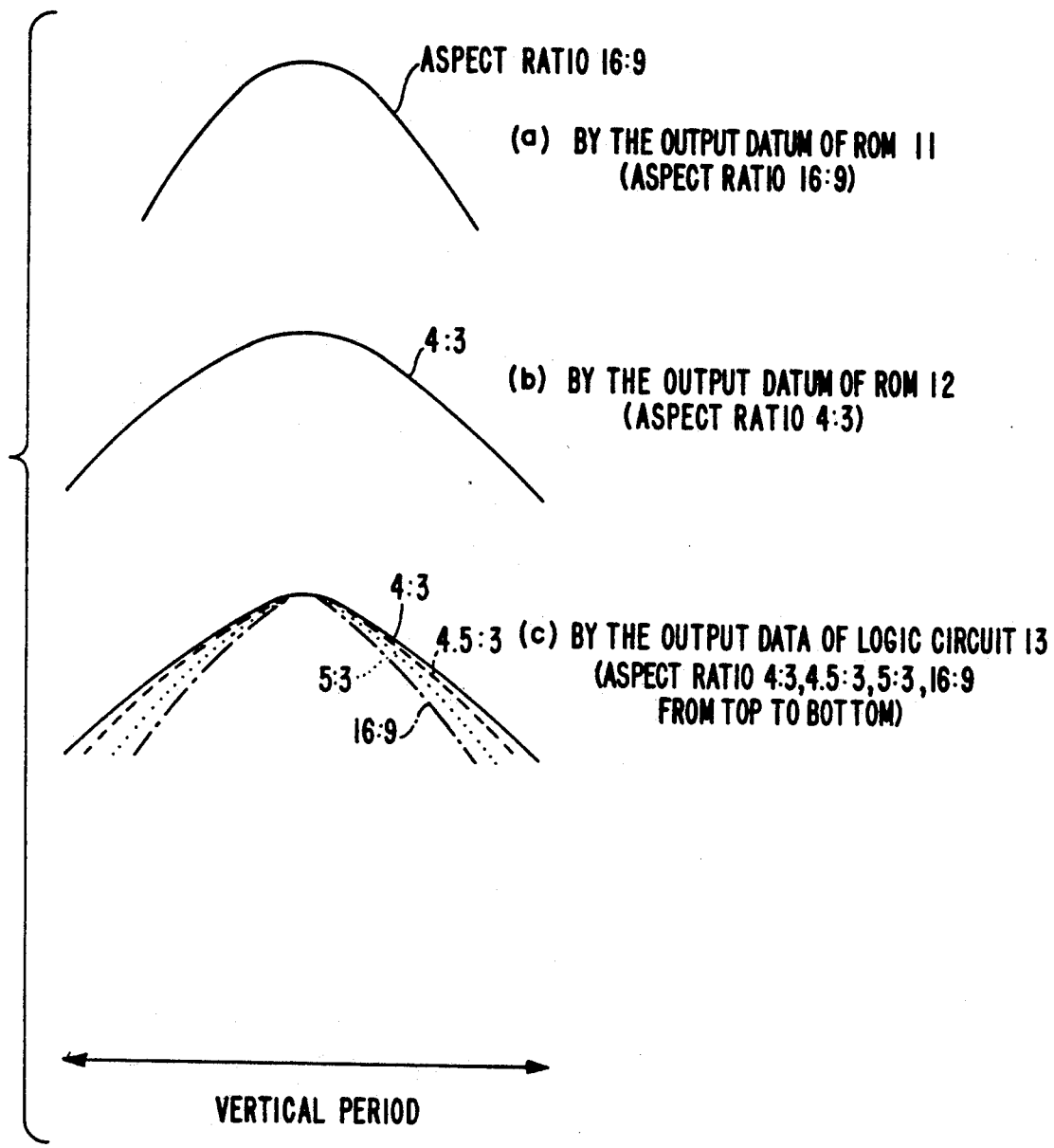
FIG 4 illustrates waveforms of the output of the parabolic waveform generating apparatus in an example of the present invention when the output is derived from the output data of ROM 11; illustrates waveforms of the output of the parabolic waveform generating apparatus in an example of the present invention when the output is derived from the output data of ROM 12; and illustrates waveforms of the output of the parabolic waveform generating apparatus in an example of the present invention when the output is derived from the output data of the logic circuit 13.

Exemplary output waveforms of the parabolic waveform generating apparatus of the present invention are shown in FIG. 4. As shown in FIG. 4(a) and (b), when the data of the parabolic waveforms corresponding to the aspect ratio (16:9) and (4:3) are stored in ROM 11 and ROM 12 respectively and an aspect ratio H/V is applied to the input of the logic circuit 13, the coefficients a and (1-a) are calculated according to the equation (1). And the two data which designate the amplitudes of the two parabolic waveforms stored in ROM 11 and ROM 12 are read out by the clock signal at each sampling time of one vertical period of the video signal, then these data values are combined according to equation (2) at each sampling time in the logic circuit 13. As a result, a parabolic waveform corresponding to an arbitrary aspect ratio, for example (5:3) or (4.5:3), is obtained at the output of the parabolic waveform generating circuit 6 as shown in FIG. 4(c).

According to the present invention, because two ROM's are provided to store data values for generating parabolic waveforms corresponding to each different basic aspect ratio and a logic circuit to calculate data for generating parabolic waveforms corresponding to arbitrary aspect ratios from each data for generating parabolic waveform corresponding to the two basic aspect ratios, it is unnecessary for any ROM to store data values for every aspect ratio of displayed images. In other words, any number of parabolic waveforms corresponding to an arbitrary aspect ratio can be generated with only two ROM's.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

Although in the above explanation an equation of the first order (1) is shown for an example, an equation of any order is available as long as a=0 at one of the two basic aspect ratios and a=1 at another aspect ratio.

What is claimed:

1. A parabolic waveform generating apparatus for generating parabolic waveforms for compensating at least one of horizontal and vertical deflection distortion of images in a television receiver with respect to one of a plurality of aspect ratios, said parabolic waveform generating apparatus comprising:

memory means including only a first data value group and a second data value group, said first data value group useable for generating a first parabolic waveform and said second data value group useable for generating a second parabolic waveform;

processing means for processing said first data value group and said second data value group in order to generate a further data value group which corresponds to an arbitrary aspect ratio of said plurality of aspect ratios which is different from a first aspect ratio of said plurality of aspect ratios which corresponds to said first parabolic waveform and which is different from a second aspect ratio of said plurality of aspect ratios which corresponds to said second parabolic waveform; and parabolic waveform generating means for generating a further parabolic waveform for use by said television receiver, said further parabolic waveform corresponding to said arbitrary aspect ratio from said further data value group.

* * * * *